United States Patent
Fu et al.

(10) Patent No.: US 12,284,989 B2
(45) Date of Patent: Apr. 29, 2025

(54) DISEASE CONTROL METHOD FOR RECIRCULATING AQUACULTURE OF PLECTROPOMUS LEOPARDUS BROODSTOCK

(71) Applicant: Hainan Academy of Ocean and Fisheries Sciences, Haikou (CN)

(72) Inventors: Shuyuan Fu, Haikou (CN); Jinye Liu, Haikou (CN); Yongbo Wang, Haikou (CN); Fuxiao Chen, Haikou (CN)

(73) Assignee: Hainan Academy of Ocean and Fisheries Sciences, Haikou (CN)

( * ) Notice: Subject to any disclaimer, the term of this patent is extended or adjusted under 35 U.S.C. 154(b) by 26 days.

(21) Appl. No.: 18/448,357

(22) Filed: Aug. 11, 2023

(65) Prior Publication Data
US 2024/0423172 A1  Dec. 26, 2024

(30) Foreign Application Priority Data
Jun. 26, 2023  (CN) ......................... 202310764448.X

(51) Int. Cl.
*A01K 61/13*  (2017.01)
*A01K 63/04*  (2006.01)
(Continued)

(52) U.S. Cl.
CPC .............. *A01K 61/13* (2017.01); *A01K 63/04* (2013.01); *C02F 9/00* (2013.01); *C02F 1/001* (2013.01);
(Continued)

(58) Field of Classification Search
CPC ...... A01K 61/13; A01K 63/04; A01K 63/042; A01K 63/045; A01K 61/80; A01K 61/00;
(Continued)

(56) References Cited

U.S. PATENT DOCUMENTS

| 4,186,093 A | * | 1/1980 | Willinger | A01K 63/045 210/167.24 |
| 7,306,733 B2 | * | 12/2007 | Olivier | B01F 25/50 210/615 |

FOREIGN PATENT DOCUMENTS

| CN | 104335933 A | * | 2/2015 | .............. A01K 61/00 |
| CN | 106305572 A | * | 1/2017 | ........... A01K 63/003 |

(Continued)

OTHER PUBLICATIONS

CN_104335933_A_MACHINE_TRANSLATION (Year: 2015).*
(Continued)

*Primary Examiner* — Peter M Poon
*Assistant Examiner* — Sahar Almatrahi
(74) *Attorney, Agent, or Firm* — CHRISTENSEN O'CONNOR JOHNSON KINDNESS PLLC

(57) ABSTRACT

The present disclosure provides a disease control method for recirculating aquaculture of *Plectropomus leopardus* broodstocks. The disease control method provided by the present disclosure includes water treatment, temperature control, air treatment, nutritional regulation, and biological control. The water treatment includes steps of allowing tail water of a broodstock rearing pond to flow through a balancing pond and a water collection pond to remove floating solid organic and inorganic compounds, and allowing residual wastewater to flow through a protein separation pond, a sand filter pond, a biofilter pond and a disinfection pond for treatment and recycling; the temperature control includes water temperature control using an air-source heat pump; the air treatment includes filtration of air in air-feeding equipment and ventilation pipes; the nutritional regulation includes regular feeding of a formula diet into the broodstock rearing pond; and the biological control includes rearing of *Thais luteostoma* in the broodstock rearing pond.

9 Claims, 1 Drawing Sheet

(51) Int. Cl.
*C02F 9/00* (2023.01)
*C02F 1/00* (2023.01)
*C02F 1/32* (2023.01)
*C02F 1/78* (2023.01)
*C02F 3/10* (2023.01)
*C02F 101/10* (2006.01)
*C02F 101/38* (2006.01)
*C02F 103/20* (2006.01)

(52) U.S. Cl.
CPC ............. *C02F 1/32* (2013.01); *C02F 1/78* (2013.01); *C02F 3/10* (2013.01); *C02F 2101/10* (2013.01); *C02F 2101/38* (2013.01); *C02F 2103/20* (2013.01); *C02F 2209/02* (2013.01); *C02F 2303/04* (2013.01)

(58) Field of Classification Search
CPC ....... A01K 61/10; B01D 46/0028; C02F 9/00; C02F 1/001; C02F 1/32; C02F 1/78; C02F 2101/10; C02F 2209/02; C02F 1/008; C02F 3/10; C02F 2101/38; C02F 2103/20; C02F 2303/04
USPC .......................................................... 119/227
See application file for complete search history.

(56) References Cited

FOREIGN PATENT DOCUMENTS

CN  213939377 U  *  8/2021  ........... A01K 63/003
CN  114097955 A  *  3/2022  ............. A01K 61/10

OTHER PUBLICATIONS

CN_106305572_A_MACHINE_TRANSLATION (Year: 2017).*
CN_114097955_MACHINE_TRANSLATION (Year: 2022).*
CN_213939377_U_MACHINE_TRANSLATION (Year: 2021).*

* cited by examiner

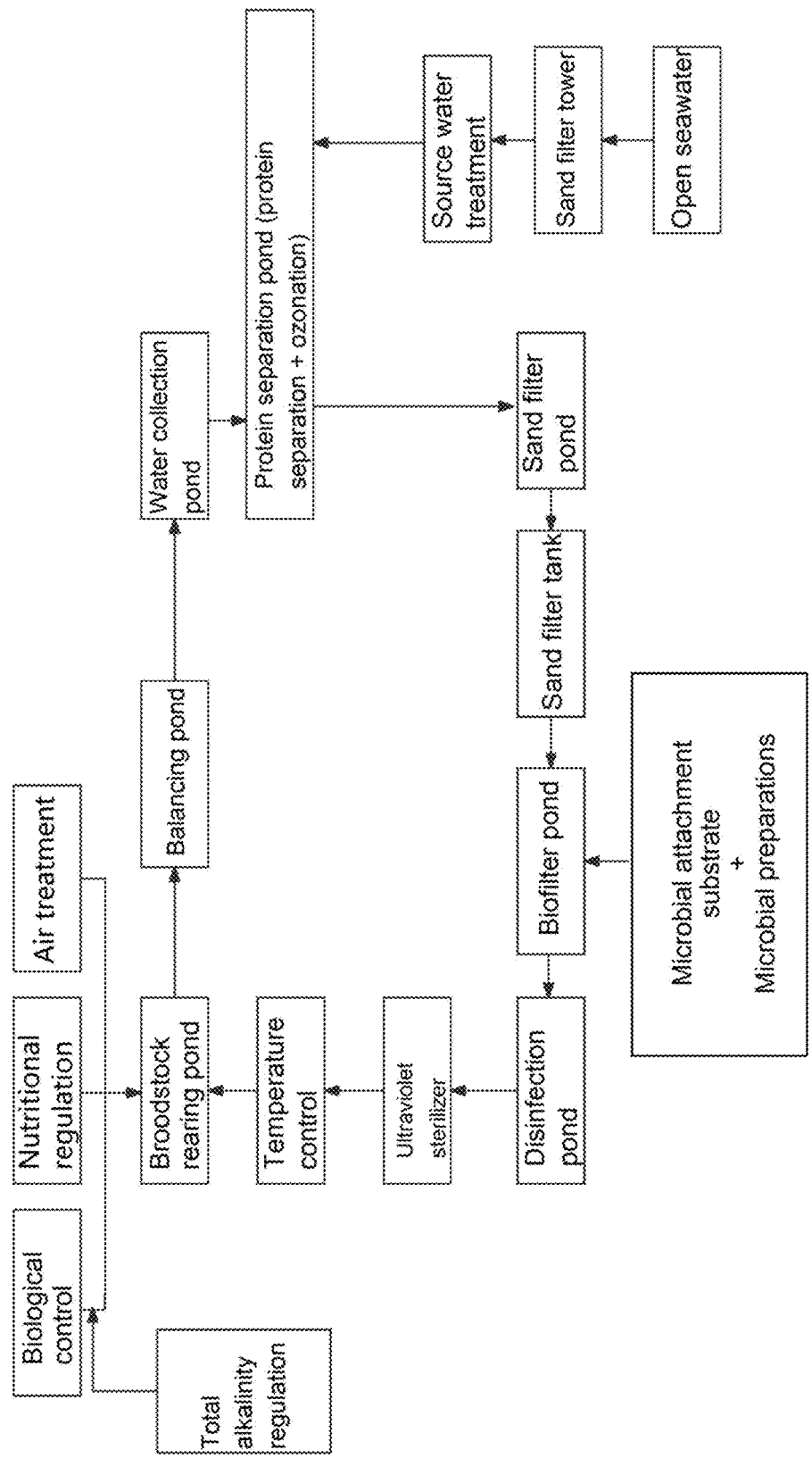

DISEASE CONTROL METHOD FOR RECIRCULATING AQUACULTURE OF PLECTROPOMUS LEOPARDUS BROODSTOCK

CROSS REFERENCE TO RELATED APPLICATION

This patent application claims the benefit and priority of Chinese Patent Application No. 202310764448X, filed with the China National Intellectual Property Administration on Jun. 26, 2023, the disclosure of which is incorporated by reference herein in its entirety as part of the present application.

TECHNICAL FIELD

The present disclosure belongs to the technical field of mariculture, and particularly relates to a disease control method for recirculating aquaculture of *Plectropomus leopardus* broodstocks.

BACKGROUND

*Plectropomus leopardus*, commonly known as leopard coral trout, is a special fish species in Xisha and Nansha waters of Hainan. Known as the "fish of state banquet", *Plectropomus leopardus* is one of the species with economic development value among groupers. With a red body, tender fish meat, and rich nutrition, *Plectropomus leopardus* is favored by consumers and becomes the most expensive commercial fish, which has a huge consumer market inside and outside of China. Since the $21^{st}$ century, the Hainan Academy of Ocean and Fisheries Sciences, used to be known as the Hainan Fisheries Research Institute, first broken through the artificial fecundation and aquaculture technology of *Plectropomus leopardus* in China. Until recently, a great increase in market demand for *Plectropomus leopardus*, plus increasingly mature artificial fecundation and aquaculture industry chain of groupers in Hainan, promotes the rapid development of large-scale *Plectropomus leopardus* aquaculture industry in Hainan.

At present, sea waters net-cage culture is the major mode of leopard coral trout broodstock rearing in the prior art, which has a plurality of problems, like no closure of the culture system, frequent invasion of causal organisms, and more diseases in the aquaculture process. Main causal organisms include *Amyloodinium ocellatum*, *Cryptocaryon irritans*, and *Zeylanicobdella arugamensis*, leading to an overall decrease in broodstock survival rate. In addition, In the *Industrial Aquaculture Experiment of Plectropomus leopardus* (Wang Y B, Zheng F, Liu J Y, et al. Industrial Aquaculture Experiment of *Plectropomus leopardus*[J]. Journal of Tropical Biology, 2014, 5(01): 15-19. DOI: 10.15886/j.cnki.rdswxb.2014.01.014.), an industrial aquaculture mode of *Plectropomus leopardus* was disclosed, which did not realize recirculating aquaculture and had a problem of unclosed aquaculture system. Chinese patent No. CN103004668A discloses a *Plectropomus leopardus* fry north industrialized high-density circulation water rearing method. However, the method only optimizes the water treatment system and lowers fry death rate by reducing broodstock self-mutilation, but does not functionally optimize how to reduce the disease occurrence.

Therefore, a problem urgent to be solved in *Plectropomus leopardus* broodstock rearing is how to realize the recirculating aquaculture of *Plectropomus leopardus* broodstocks and enrich the function of the aquaculture system thereof to reduce the risk of invasion of causal organisms and susceptibility to diseases.

SUMMARY

In view of this, the present disclosure aims to provide a disease control method for recirculating aquaculture of *Plectropomus leopardus* broodstocks to reduce disease occurrence and death rate in broodstock rearing.

To achieve the above objective, the present disclosure provides the following technical solution:

A disease control method for recirculating aquaculture of *Plectropomus leopardus* broodstocks is provided, including water treatment, temperature control, air treatment, nutritional regulation, and biological control;
the water treatment includes steps of allowing tail water of a broodstock rearing pond to flow through a balancing pond and a water collection pond to remove floating solid organic and inorganic compounds, and allowing residual wastewater to flow through a protein separation pond, a sand filter pond, a biofilter pond and a disinfection pond for treatment and recycling;
the temperature control includes water temperature control using an air-source heat pump;
the air treatment includes filtration of air in air-feeding equipment and ventilation pipes;
the nutritional regulation includes regular feeding of a formula diet into the broodstock rearing pond; and
the biological control includes rearing of *Thais luteostoma* in the broodstock rearing pond.

Preferably, the protein separation pond is provided with a protein separator and an ozonator.

Preferably, the sand filter pond includes a sand filter tank and a sand filter tower and has a filter fineness of 20 μm.

Preferably, the biofilter pond is provided with a microbial attachment substrate, and microbial preparations with nitrification and denitrification are fed for water purification.

Preferably, the disinfection pond is provided with an ultraviolet (UV) sterilizer.

Preferably, the water temperature control is performed at 23-30° C.

Preferably, the air has a filter fineness of 15 μm.

Preferably, the formula diet is fed every 2-4 days, including high-grade fish oil, lactic acid bacteria (LAB), minced crab meat, and vitamins C, D, E and K3.

Preferably, the *Thais luteostoma* has a breeding density of 8-12 snails/m², with a shell length of ≥2.5 cm.

Preferably, aquaculture water for the *Plectropomus leopardus* broodstocks is derived from open seawater, and the open seawater undergoes source water treatment to enter the protein separation pond and circulate into the broodstock rearing pond.

Compared with the prior art, the present disclosure has the following beneficial effects:

The present disclosure provides a disease control method for recirculating aquaculture of *Plectropomus leopardus* broodstocks. Because broodstocks are reared in circulating water, by increasing temperature by means of an air heating installation, broodstocks are well fed, feeding rate is substantially 1-3% of broodstock weight, and various nutrients for the broodstocks are substantially satisfied. Therefore, the broodstocks are in good condition. In view of air feed in aquaculture, if front-end filtration for air feed is added, the filter fineness will reach 15 μm, while air disinfection is added for UV sterilization. At an aquaculture water level, in view of the particle size of causal organisms in a recirculating aquaculture system, a sand filter tank and a sand filter tower with a filter fineness of 20 μm should be used for filtration to effectively remove a majority of larvae and cysts of ciliates. In addition, additional high-power UV disinfection of bacteria and viruses obtains an excellent broodstock rearing effect.

In the present disclosure, by establishing a disease control system for closed recirculating broodstock aquaculture, particularly adding means of air treatment, biological control and nutritional regulation, the death rate of broodstocks is dropped from 40% in cage culture to below 5%, and the effect is obvious. The main reason is that larvae and eggs of various parasites are effectively isolated and eliminated to substantially lower risk of exposure and infection.

BRIEF DESCRIPTION OF THE DRAWINGS

FIG. 1 shows a schematic diagram of a disease control method for recirculating aquaculture of *Plectropomus leopardus* broodstocks provided by the present disclosure.

DETAILED DESCRIPTION OF THE EMBODIMENTS

The present disclosure provides a disease control method for recirculating aquaculture of *Plectropomus leopardus* broodstocks, including water treatment, temperature control, air treatment, nutritional regulation, and biological control. In the present disclosure, a closed recirculating broodstock aquaculture system is established to isolate the invasion of causal organisms and defense propagation thereof and expanded infection and parasitic hazards thereof after random invasion.

In the present disclosure, the water treatment includes steps of allowing tail water of a broodstock rearing pond to flow through a balancing pond and a water collection pond to remove floating solid organic and inorganic compounds, and allowing residual wastewater to flow through a protein separation pond, a sand filter pond, a biofilter pond and a disinfection pond for treatment and recycling. Namely, aquaculture water is mainly treated by physical, chemical and biological methods, and high-density and green recirculating aquaculture of broodstocks is carried out in combination with a disease control technology.

As an implementation, the present disclosure uses a spare workshop for transformation, and a pump is provided to satisfy hydrodynamics of water circulation and ensure that a daily quantity of exchanged water of the broodstock rearing pond is >300% for recycling of aquaculture tail water.

In the present disclosure, the protein separation pond is preferably provided with a protein separator and an ozonator. The protein separator, also known as foam separator or protein skimmer, can effectively eliminate organic particles and harmful metal ions from the aquaculture tail water. When used in combination with ozone, the protein separator can eliminate biologically water-soluble protein residues, excreta and secretions from water before decomposition into ammonia nitrogen and nitrite. This not only substantially reduces organic loading in water and toxic substance content in water, but also lightens disposal load of a subsequent biochemical system and increases oxygen supply to the system, ensuring reliability of subsequent water outlet. When using the protein separator and mixing the ozone for reaction, auxiliary ozone is efficiently diffused and well mixed, and the protein separator can guarantee specific indwelling and reaction time of the ozone, so that toxic substances in water are decomposed by oxidation more effectively. There is no particular limitation on models of the protein separator and the ozonator in the present disclosure, as long as both machines can be commercially available and mounted and assembled according to the volume of the aquaculture tail water.

In the present disclosure, the sand filter pond preferably includes a sand filter tank and a sand filter tower and has a filter fineness of 20 μm. In the present disclosure, the sand filter tank can be commercially available; the sand filter tower, from bottom to top, is composed of a pebble layer, a coarse sand layer, a barrier layer, and a fine sand layer, where the coarse sand layer is 3-5 mm in particle size, the fine sand layer is 0.2-0.5 mm in particle size, the barrier layer is a plastic mesh, and mesh number is subject to no find sand infiltration.

In the present disclosure, the biofilter pond is preferably provided with a microbial attachment substrate, and microbial preparations with nitrification and denitrification are fed for water purification. In the present disclosure, the microbial attachment substrate is preferably a fine-line hairbrush and/or a cotton filter, providing an attachment condition for microbial growth and reproduction. There is no limitation on specific sources of the microbial preparations, and the microbial preparations can be commercially available.

In the present disclosure, the disinfection pond is preferably provided with a UV sterilizer. At least 95% of DNAs in a biological tissue can be killed by using the UV sterilizer, so that reproduction cannot be performed any more. The UV sterilizer is effective against bacteria, viruses, algae, yeasts, mold spores, and the like. The UV sterilizer has an obvious bactericidal effect. With a rapid, simple and efficient bactericidal capability, the UV sterilizer can rapidly kill viruses and bacteria that possibly survive in circulating water. Treated aquaculture water and air are odorless and have no side effect on aquaculture organisms.

In the present disclosure, the temperature control includes water temperature control using an air-source heat pump. The water temperature control is preferably performed at 23-30° C., further preferably 25-28° C., and more preferably 26-27° C. In the present disclosure, a temperature sensor is preferably arranged in water to control the air-source heat pump for the water temperature control.

In the present disclosure, the air treatment includes filtration of air in air-feeding equipment and ventilation pipes. Filtering equipment is arranged at a front air inlet end of the ventilation pipes and air-feeding equipment of the broodstock rearing pond. Preferably, the air has a filter fineness of ≤15 μm. Further preferably, the air is filtered, sterilized in UV air and passed into an air-blower for air-feeding of aquaculture workshops.

In the present disclosure, the nutritional regulation includes regular feeding of a formula diet into the broodstock rearing pond; preferably, the formula diet is fed every 2-4 days, and further preferably every 3 days, including high-grade fish oil, LAB, minced crab meat, and vitamins C, D, E and K3.

In the present disclosure, the biological control includes rearing of *Thais luteostoma* in the broodstock rearing pond. With a food intake habit of licking pond wall, the *Thais luteostoma* is intended to clear parasitic eggs, improve biological control ability of the system, and put an end to parasite reproduction. In the present disclosure, the *Thais luteostoma* preferably has a breeding density of 8-12 snails/$m^2$, and further preferably 10 snails/$m^2$, with a shell length of ≥2.5 cm. In the present disclosure, light intensity in the broodstock rearing pond is preferably controlled at 3,000-5,000 Lux. The *Thais luteostoma* is put 3 days after benthic diatoms. Calcium and magnesium ion products are put every 12-18 days, and further preferably every 15 days. Total alkalinity of water body is controlled at ≥19.4 mg/L to satisfy the growth of the *Thais luteostoma*.

In the present disclosure, before the aquaculture tail water is returned to the broodstock rearing pond, the aquaculture tail water is preferably filtered through activated corallite; further preferably, 8-12 cm thick, and more preferably 10 cm thick, activated corallite is provided at a bottom of a water channel.

In the present disclosure, water quality is preferably monitored during aquaculture, and working conditions in each process of water treatment are timely adjusted and balanced according to the information of result feedback, so as to achieve an optimal water treatment effect.

In the present disclosure, aquaculture water for the *Plectropomus leopardus* broodstocks is preferably derived from open seawater, and the open seawater undergoes source water treatment to enter the protein separation pond and circulate into the broodstock rearing pond. As an implementation, the source water treatment in the present disclosure preferably includes steps of: passing seawater through the sand filter pond, and disinfecting the seawater with an electromagnetic sterilizer to enter the protein separation pond and circulate into the broodstock rearing pond for use.

The technical solutions provided by the present invention will be described in detail below with reference to examples, but the examples should not be construed as limiting the claimed scope of the present invention.

Example 1

A disease control method for recirculating aquaculture of *Plectropomus leopardus* broodstocks was provided, including the following steps:
(1) a spare workshop was transformed and provided with a pump to satisfy hydrodynamics of water circulation and ensure that a daily quantity of exchanged water of the broodstock rearing pond was >300%;
(2) a water treatment system was established, including:
a balancing pond;
a water collection pond;
a protein separation pond, which was provided with a protein separator and an ozonator;
a sand filter pond, which was provided with a sand filter tank and a sand filter tower and has a filter fineness of 20 μm;
a biofilter pond, which used a fine-line hairbrush and a cotton filter as a microbial attachment substrate, and in which microbial preparations with nitrification and denitrification were fed; and
a disinfection pond, which was provided with a UV sterilizer;
(3) a temperature control system was established, including:
heating the water body with an air-source heat pump, and arranging a temperature sensor to control the water temperature at 23-30° C.;
(4) an air treatment system was established, including:
filtering air at the front air inlet end of the ventilation pipes of the broodstock rearing workshop and the air-feeding equipment of the broodstock rearing pond and has a filter fineness of 15 μm, and disinfecting in the UV air to enter an air-blower;

(5) aquaculture water was introduced, including:
introducing open seawater, passing seawater through the sand filter pond, and disinfecting the seawater with an electromagnetic sterilizer to enter the protein separation pond for recycling;
(6) *Plectropomus leopardus* aquaculture and nutritional regulation were carried out, including:
putting *Plectropomus leopardus* broodstocks in the broodstock rearing pond, and recycling the aquaculture tail water by means of the water treatment system; and feeding a formula diet coated with a mixture of vitamins C, D, E and K3+high-grade fish oil+LAB+minced crab meat every 2-4 days; and
(7) the broodstock rearing pond underwent biological control, including:
controlling the light intensity of the broodstock rearing pond at 3,000-5,000 Lux, breeding *Thais luteostoma* at a breeding density of 8-12 snails/m², with a shell length of ≥2.5 cm, putting calcium and magnesium ion products every 12-18 days, and controlling the total alkalinity of water body at ≥19.4 mg/L.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A disease control method for recirculating aquaculture of *Plectropomus leopardus* broodstocks, comprising steps of water treatment, temperature control, air treatment, nutritional regulation, and biological control, wherein
the water treatment comprises steps of allowing tail water of a broodstock rearing pond to flow through a balancing pond and a water collection pond to remove floating solid organic and inorganic compounds, and allowing residual wastewater to flow through a protein separation pond, a sand filter pond, a biofilter pond and a disinfection pond for treatment and recycling;
the temperature control comprises water temperature control using an air-source heat pump;
the air treatment comprises filtration of air in air-feeding equipment and ventilation pipes;
the nutritional regulation comprises regular feeding of a formula diet into the broodstock rearing pond; and
the biological control comprises rearing of *Thais luteostoma* in the broodstock rearing pond;
wherein the *Thais luteostoma* has a breeding density of 8-12 snails/m², with a shell length of ≥2.5 cm.

2. The disease control method for recirculating aquaculture of *Plectropomus leopardus* broodstocks according to claim 1, wherein the protein separation pond is provided with a protein separator and an ozonator.

3. The disease control method for recirculating aquaculture of *Plectropomus leopardus* broodstocks according to claim 1, wherein the sand filter pond comprises a sand filter tank and a sand filter tower and has a filter fineness of 20 μm.

4. The disease control method for recirculating aquaculture of *Plectropomus leopardus* broodstocks according to claim 1, wherein the biofilter pond is provided with a microbial attachment substrate, and microbial preparations with nitrification and denitrification are fed for water purification.

5. The disease control method for recirculating aquaculture of *Plectropomus leopardus* broodstocks according to claim 1, wherein the disinfection pond is provided with an ultraviolet (UV) sterilizer.

6. The disease control method for recirculating aquaculture of *Plectropomus leopardus* broodstocks according to claim 1, wherein the water temperature control is performed at 23-30° C.

7. The disease control method for recirculating aquaculture of *Plectropomus leopardus* broodstocks according to claim 1, wherein the air has a filter fineness of 15 μm.

8. The disease control method for recirculating aquaculture of *Plectropomus leopardus* broodstocks according to claim 1, wherein the formula diet is fed every 2-4 days, and the formula diet comprises high-grade fish oil, lactic acid bacteria (LAB), minced crab meat, and vitamins C, D, E and K3.

9. The disease control method for recirculating aquaculture of *Plectropomus leopardus* broodstocks according to claim 1, wherein aquaculture water for the *Plectropomus leopardus* broodstocks is derived from open seawater, and the open seawater undergoes source water treatment to enter the protein separation pond and circulate into the broodstock rearing pond.

\* \* \* \* \*